US010989855B2

(12) United States Patent
Cox et al.

(10) Patent No.: US 10,989,855 B2
(45) Date of Patent: Apr. 27, 2021

(54) ILLUMINATION DEVICE FOR PROJECTING LIGHT IN A PREDETERMINED ILLUMINATION PATTERN ON A SURFACE

(71) Applicant: AGM Automotive, LLC, Wilmington, DE (US)

(72) Inventors: Bradley Matthew Albert Cox, Farmington Hills, MI (US); Cye David Bittner, Clinton Township, MI (US)

(73) Assignee: AGM Automotive, LLC, Wilmington, DE (US)

( * ) Notice: Subject to any disclaimer, the term of this patent is extended or adjusted under 35 U.S.C. 154(b) by 29 days.

(21) Appl. No.: 16/184,702

(22) Filed: Nov. 8, 2018

(65) Prior Publication Data

US 2019/0137677 A1    May 9, 2019

Related U.S. Application Data

(60) Provisional application No. 62/583,878, filed on Nov. 9, 2017.

(51) Int. Cl.
*F21V 8/00* (2006.01)
*F21V 17/10* (2006.01)
(Continued)

(52) U.S. Cl.
CPC .......... *G02B 6/0008* (2013.01); *B60Q 3/217* (2017.02); *B60Q 3/267* (2017.02); *B60Q 3/54* (2017.02);
(Continued)

(58) Field of Classification Search
CPC ....... G02B 6/0008; F21V 5/008; F21V 13/10; F21V 13/02; F21V 17/005; F21V 17/10;
(Continued)

(56) References Cited

U.S. PATENT DOCUMENTS 4,104,709 A * 8/1978 Kloots .................... F21L 14/00
                                                           362/105
4,257,086 A * 3/1981 Gulliksen ................ F21V 5/00
                                                           362/279
(Continued)

FOREIGN PATENT DOCUMENTS

CN      107023793 A     8/2017
DE        3444823 A1    6/1986
(Continued)

OTHER PUBLICATIONS

PCT International Search Report for PCT/US2018/060080 dated Feb. 27, 2019.

*Primary Examiner* — Jong-Suk (James) Lee
*Assistant Examiner* — James M Endo
(74) *Attorney, Agent, or Firm* — Volpe Koenig (57) ABSTRACT

Described herein is an illumination device for projecting light in a predetermined illumination pattern on a surface. The illumination device includes a light module having a light source and a light pipe configured to transmit light in any suitable manner. The illumination device also includes a housing having a cavity, an entrance opening for receiving the light emitted from the light source, and an aperture at a second housing end. Within the housing between the entrance opening and the aperture is a screen at least partially disposed in the cavity, the screen having at least one opening defining a base pattern configuration corresponding to the predetermined illumination pattern. The light pipe is configured to selectively transmit light from the light source to the cavity and may be linear or non-linear such that the light source and the surface to be illuminated do not need to face one another.

19 Claims, 9 Drawing Sheets

(51) Int. Cl.

| | | |
|---|---|---|
| *F21V 11/00* | (2015.01) | |
| *F21V 5/00* | (2018.01) | |
| *F21V 31/00* | (2006.01) | |
| *B60Q 3/54* | (2017.01) | |
| *B60Q 3/267* | (2017.01) | |
| *B60Q 3/217* | (2017.01) | |
| *B60Q 3/64* | (2017.01) | |
| *F21W 103/60* | (2018.01) | |
| *F21Y 115/10* | (2016.01) | |

(52) U.S. Cl.
CPC .............. *B60Q 3/64* (2017.02); *F21V 5/00* (2013.01); *F21V 11/00* (2013.01); *F21V 17/10* (2013.01); *F21V 31/005* (2013.01); *B60Q 2400/50* (2013.01); *F21W 2103/60* (2018.01); *F21Y 2115/10* (2016.08)

(58) Field of Classification Search
CPC .......... F21V 11/08; F21V 11/10; F21V 11/12; F21V 11/00; B60Q 3/54; B60Q 3/267; B60Q 3/217; B60Q 3/64; B60Q 3/51; B60Q 3/57; B60Q 3/74; B60Q 3/30; B60Q 3/225; B60Q 2400/50; F21W 2103/60
USPC ....... 362/581, 576, 555, 558, 268, 331, 248; 359/819, 827, 830, 828
See application file for complete search history.

(56) References Cited

U.S. PATENT DOCUMENTS

| | | | | |
|---|---|---|---|---|
| 4,662,717 A * | 5/1987 | Yamada | ............... | G02B 7/022 359/362 |
| 5,249,082 A * | 9/1993 | Newman | ............... | G02B 7/028 359/813 |
| 5,678,953 A * | 10/1997 | Usui | ............... | F16B 21/088 359/819 |
| 6,042,256 A * | 3/2000 | Gothard | ............... | G02B 6/0008 362/153 |
| 7,217,022 B2 * | 5/2007 | Ruffin | ............... | G02B 6/0006 362/554 |
| 7,314,300 B1 * | 1/2008 | Dorr | ............... | A61B 90/35 362/581 |
| 7,586,697 B2 * | 9/2009 | Kuroda | ............... | G02B 7/022 359/649 |
| 2003/0147254 A1 * | 8/2003 | Yoneda | ............... | G01B 11/00 362/551 |
| 2004/0022072 A1 * | 2/2004 | Yoneda | ............... | G01N 21/8806 362/572 |
| 2004/0066565 A1 * | 4/2004 | Woods | ............... | G03B 9/06 359/739 |
| 2004/0169940 A1 * | 9/2004 | Yoshida | ............... | G02B 7/02 359/819 |
| 2007/0086206 A1 * | 4/2007 | Weng | ............... | G02B 6/4206 362/555 |
| 2007/0195548 A1 * | 8/2007 | Wang | ............... | A61N 5/062 362/555 |
| 2009/0052063 A1 * | 2/2009 | Yu | ............... | G02B 7/022 359/793 |
| 2009/0185382 A1 * | 7/2009 | Chiang | ............... | F21S 41/162 362/310 |
| 2010/0172148 A1 * | 7/2010 | Komazaki | ............ | A61B 1/0653 362/551 |
| 2013/0163106 A1 * | 6/2013 | Chang | ............... | G02B 7/08 359/824 |
| 2014/0022810 A1 * | 1/2014 | Ito | ............... | G02B 6/0006 362/551 |
| 2014/0029114 A1 * | 1/2014 | Kim | ............... | G02B 3/08 359/709 |
| 2014/0198482 A1 * | 7/2014 | Yue | ............... | F21V 31/005 362/96 |
| 2016/0047511 A1 * | 2/2016 | Jones | ............... | G02B 19/0061 362/581 |
| 2016/0356450 A1 | 12/2016 | McClelland et al. | | |

FOREIGN PATENT DOCUMENTS

| | | |
|---|---|---|
| DE | 29921178 U1 | 2/2000 |
| EP | 2325047 A1 | 5/2011 |
| JP | 2010096903 A | 4/2010 |
| JP | 2012153217 A2 | 8/2012 |
| KR | 20130101734 A | 9/2013 |
| WO | 2016/097322 A1 | 6/2016 |

* cited by examiner

ILLUMINATION DEVICE FOR PROJECTING LIGHT IN A PREDETERMINED ILLUMINATION PATTERN ON A SURFACE

CROSS REFERENCE TO RELATED APPLICATION

This application claims the benefit of U.S. provisional application No. 62/583,878 filed on Nov. 9, 2017, which is incorporated by reference as if fully set forth.

FIELD OF INVENTION

The present invention relates to an illumination system, and more specifically, to an illumination device for projecting light in a predetermined illumination pattern on a surface.

BACKGROUND

Illumination systems for illuminating a surface within an interior of a vehicle are known. Illumination systems to illuminate the surface with a particular pattern or design are also known. Illumination of an interior surface with the particular pattern or design improves visibility within the interior proximate the illuminated interior surface in low-light situations and it is considered aesthetically appealing to viewers.

One system known in the industry is an illumination system having a panel, and the panel itself includes the surface, a portion of which is partially transparent. In these systems, the partially transparent portion of the panel includes the particular pattern or design and a plurality of illumination devices, such as light emitting diodes or optical fibers, are placed behind the panel such that the panel is between the illumination devices and the viewer. In such illumination devices, the light from a light source transmits through the partially transparent portion of the panel, which illuminates the surface of the partially transparent portion such that the viewer sees the illuminated pattern or design.

While these illumination devices and illumination systems generally perform well for their intended purpose, there remains a need for an improved illumination device and illumination system.

SUMMARY

In an aspect, the invention relates to an illumination device comprising a light module having a light source and a light pipe configured to transmit light in any suitable manner between a first end and a second end, and a housing having a cavity, an entrance opening at a first housing end to receive the light, and an aperture at a second housing end. The illumination device further comprises a screen disposed within the housing between the entrance opening and the aperture, the screen including at least one opening defining a base pattern configuration corresponding to a pre-determine illumination pattern. The light pipe selectively transmits light between the light source and the cavity such that light that enters the cavity passes through the at least one opening of the base pattern configuration of the screen and projects through the aperture of the housing onto the surface in the predetermined illumination pattern.

In an embodiment, the light source is housed in a retainer. In an embodiment the light source may be a light-emitting diode (LED), a laser, a UV light, or any semi-conductive light source. In an embodiment, there may be a plurality of light sources. The light module may further comprise a printed circuit board and any other suitable electronics.

In an embodiment, the housing includes a condensing lens positioned between the second end of the light pipe and the screen such that the light that enters the housing and passes through the condensing lens is collimated toward the screen. In an embodiment, the housing includes an objective lens arrangement positioned between the screen and the aperture of the housing such that the light that passes through the base pattern configuration is configured into a correct orientation. The objective lens arrangement may include a first lens and a second lens, the first lens disposed between the entrance opening and the second lens. The housing may also include at least a disk configured to transmit light and a seal, which operatively engages the disk and the housing such that the disk and the seal combined are configured to seal the housing at the aperture.

In some embodiments, the light pipe comprises a first collar element extending radially from the light pipe proximal to its first end and a second collar element extending radially from the light pipe proximal to its second end such that the first collar element is configured to engage a portion of the retainer surrounding the first opening and the second collar element is configured to engage a portion of the housing surrounding the entrance opening.

In some embodiments, the light pipe is flexible and is configured to bend between the first end and the second end. In such an embodiment, the light source would not have to be aligned with the surface in order to project the light in a predetermined illumination pattern on to the surface.

Another aspect of the invention relates to an illumination system comprising a surface and the illumination device. The illumination device may be any of the illumination devices described herein. In an embodiment, the illumination system comprises a plurality of surfaces. In another embodiment, the illumination system comprises a plurality of illumination devices. In yet another embodiment, the illumination system comprises a plurality illumination devices and a plurality of surfaces.

The illumination device and/or the illumination system may be suitable for use in an interior of a vehicle or an exterior of a vehicle.

The illumination device disclosed herein reduces the cost of manufacturing illumination devices and illumination systems of a vehicle in that the light may be projected onto any surface and that the surface is not required to be a particular material having specific transparency properties. Furthermore, the present invention allows for the aftermarket application of the illumination device in that the illumination device may be mounted in a desired location to project the light onto the surface.

The illumination device and illumination system disclosed herein overcome the disadvantages in the related art of an illumination device for projecting light in a predetermined illumination pattern on to a surface.

BRIEF DESCRIPTION OF THE DRAWINGS

A more detailed understanding, including other features and advantages, may be had from the following description, given by way of example in conjunction with the accompanying drawings wherein.

DETAILED DESCRIPTION OF THE PREFERRED EMBODIMENTS

Figure 1:
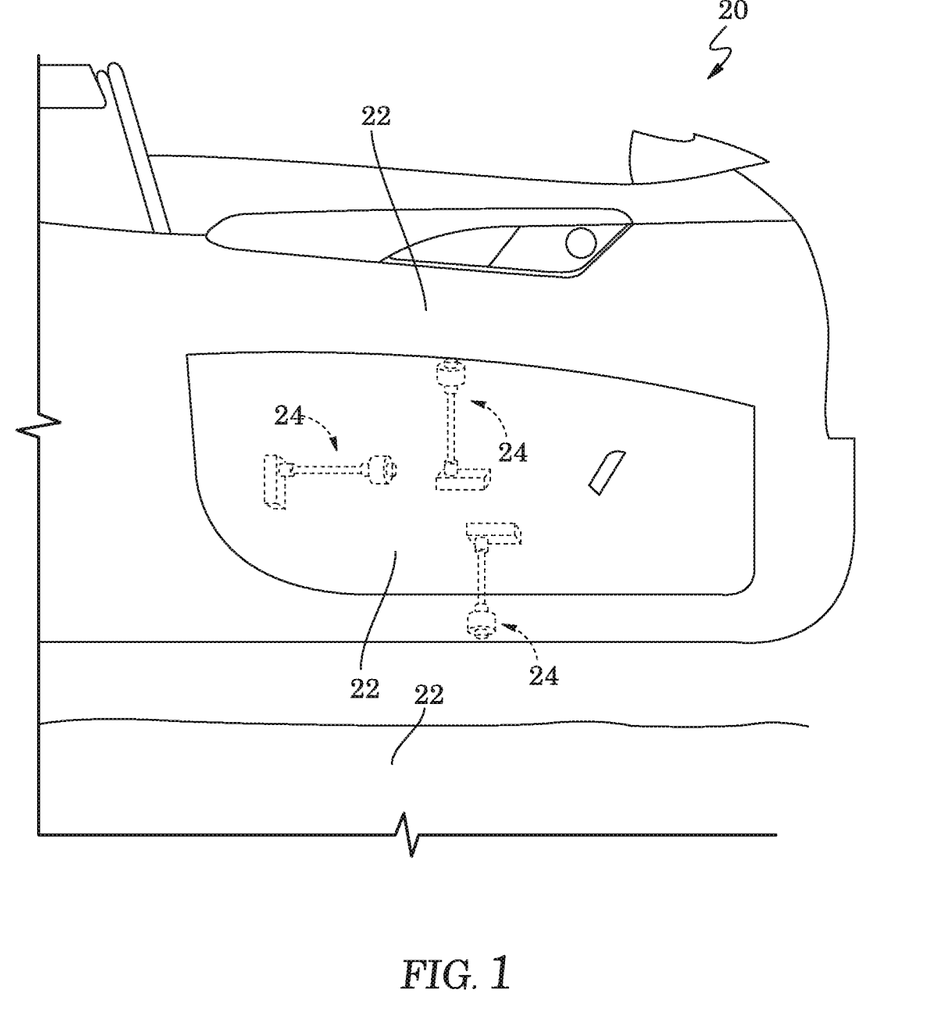
FIG. 1 is a perspective view of a plurality of illumination systems each having a surface and an illumination device.
Figure 2:
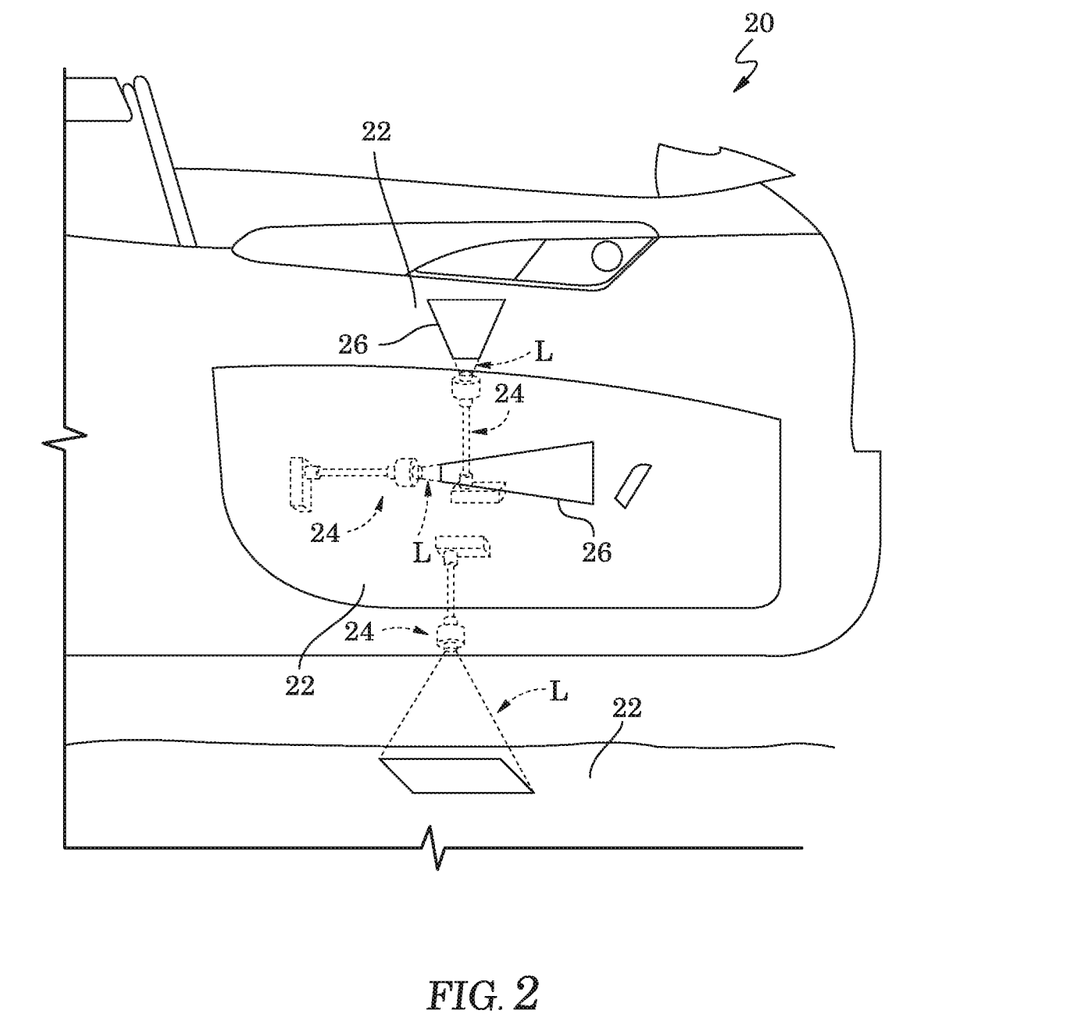
FIG. 2 is a perspective view of the plurality of illumination systems with the illumination device projecting light onto the surface.

FIG. 1 illustrates a plurality of illumination systems 20, which is illustrated in both FIGS. 1 and 2 for demonstrative purposes, such that each illumination system 20 includes an illumination device 24 and a surface 22. Each illumination system 20 may be adapted for use with a vehicle for transporting one or more occupants. However, it is to be appreciated that the illumination system 20 may be adapted for use in any system requiring illumination. The illumination system 20 includes a surface illustrated at 22, which may be defined by a component within an interior of the vehicle, including but not limited to a door panel, a vehicle floor (such as on carpeting or on a floor mat in the passenger compartment or in a cargo area), an instrument panel, a center console, and a headliner. Furthermore, the surface 22 may be defined by any suitable component of an exterior of the vehicle, including, but not limited to, a body panel, a vehicle glass, a license plate, and a wheel. It is to be appreciated that the surface 22 may be defined by any object proximate to the vehicle, such as the ground upon which the vehicle is disposed. It is also to be appreciated that the illumination system 20 may include a plurality of surfaces 22.

The illumination system 20 includes an illumination device 24, commonly referred to in the art as a shadow-lamp or a logo-lamp, for projecting light L in a predetermined illumination pattern 26 on the surface 22, as shown in FIG. 2. The predetermined illumination pattern 26 may be any shape, logo, pattern, etc. and may be any configuration, orientation, etc., of the light L. As such, the predetermined illumination pattern 26 is contemplated when designing the illumination device 24 itself, as well as the position of the illumination device 24 relative to the surface 22. In an embodiment, the illumination system 20 may include a plurality of surfaces 22.

Figure 3:
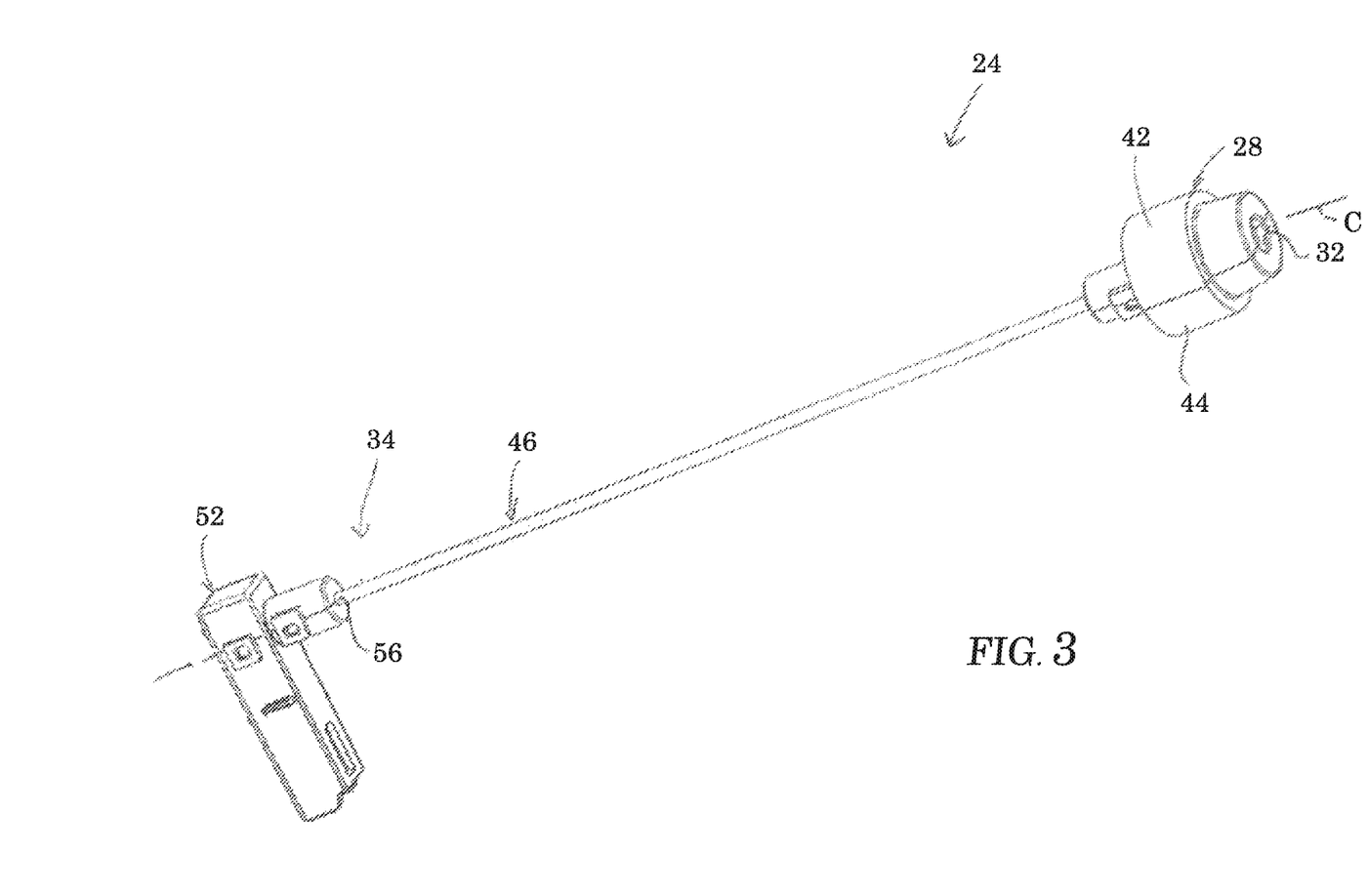
FIG. 3 is a perspective view of the illumination device.
Figure 6:
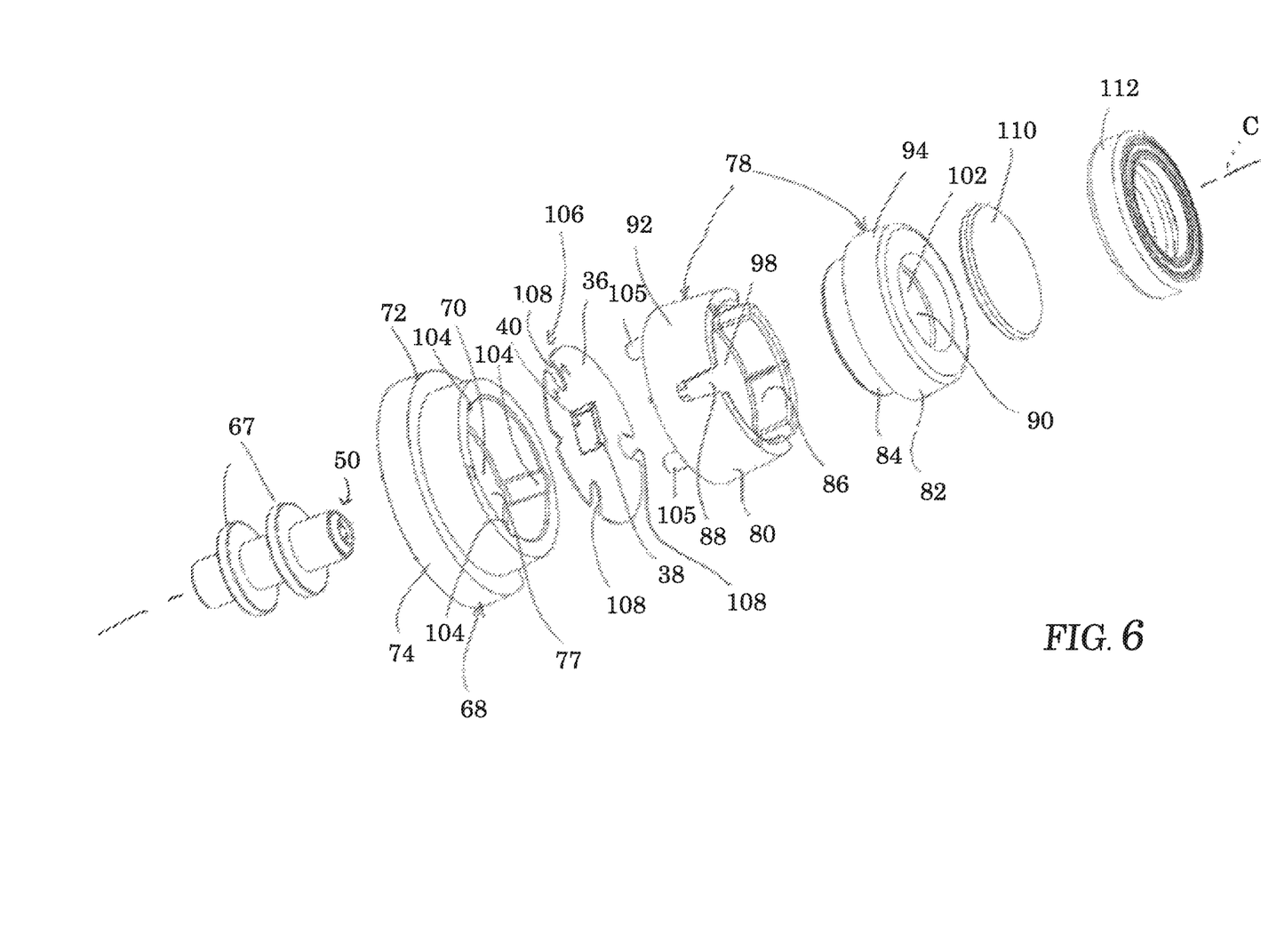
FIG. 6 is an exploded perspective view of a portion of the light pipe, the condensing lens, the screen, and the objective lens arrangement.
Figure 7:
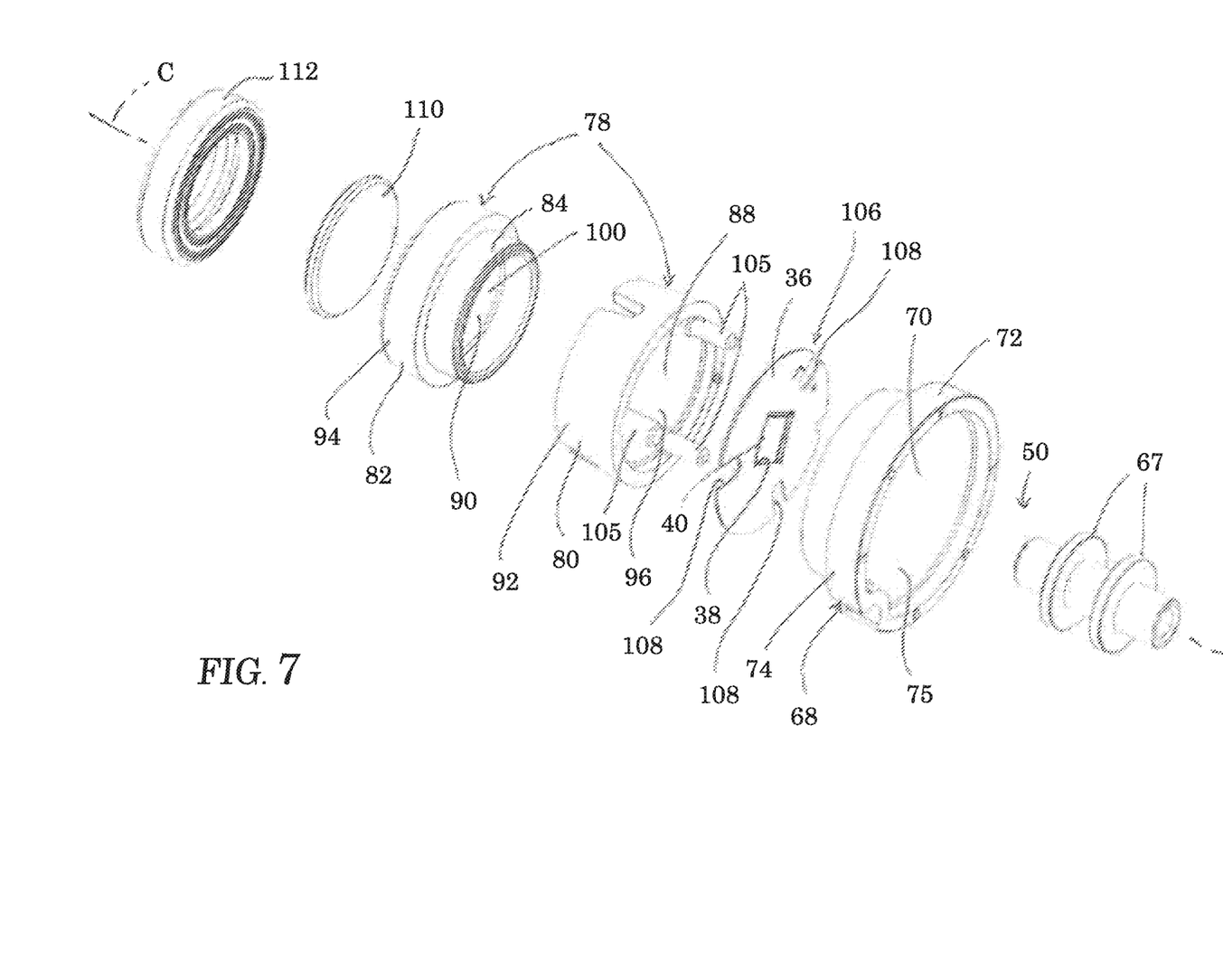
FIG. 7 is another exploded perspective view of a portion of the light pipe, the condensing lens, the screen, and the objective lens arrangement.

As shown in FIG. 3, the illumination device 24 includes a housing 28 having a cavity 30 and an aperture 32 that opens into the cavity 30. The illumination device 24 further includes a light module 34 operatively attached to the housing 28 for selectively emitting the light L into the cavity 30. The housing 28 of the illumination device 24 may further comprise a screen 36 at least partially disposed in the cavity 30 between the light module 34 and the aperture 32 as shown in FIGS. 6 and 7. The screen 36 has at least one opening 38 defining a base pattern configuration 40 corresponding to the predetermined illumination pattern 26 for aligning the light L emitted from the light module 34 through the opening 38 into the base pattern configuration 40 and subsequently projecting the light L through the aperture 32 onto the surface 22 in the predetermined illumination pattern 26, as shown in FIG. 2.

Figure 4:
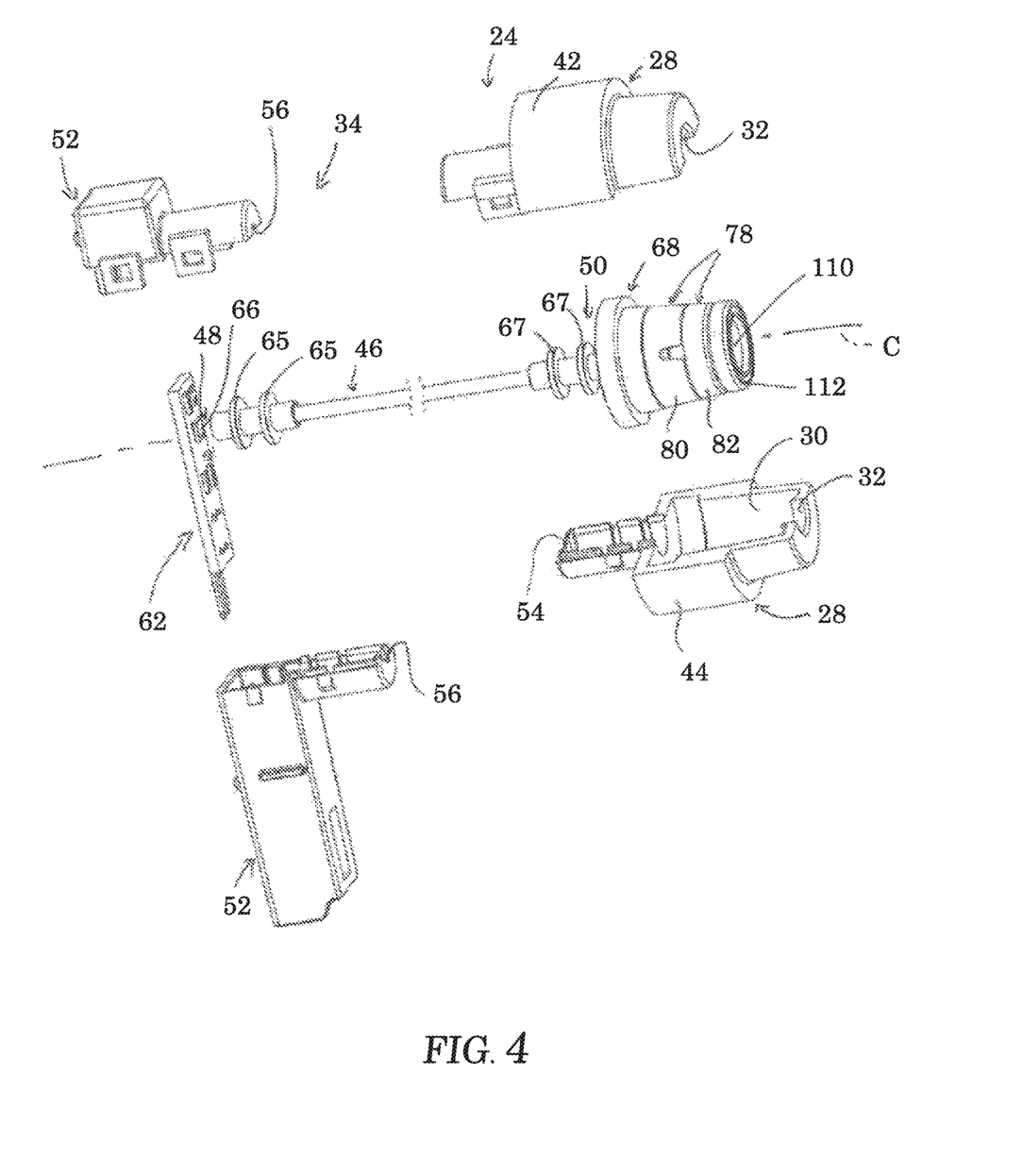
FIG. 4 is a partially exploded perspective view of the illumination device showing a retainer comprising a light module, a light pipe, and a housing comprising a condensing lens, a screen, and an objective lens arrangement.

As shown in FIG. 4, the housing 28 may have a first section 42 and a second section 44 with the first section 42 comprising the aperture 32. In another embodiment, as shown in the Figures, each of the first and second sections 42, 44 collectively form the aperture 32. The first section 42 and the second section 44 may also collectively form an entrance opening 54 opposite the aperture 32 that opens into the cavity 30. As shown in FIG. 4, the first section 42 and the second section 44 cooperate to define the cavity 30 and may collectively have a substantially cylindrical configuration. It is to be appreciated that the first section 42 and the second section 44 may have any suitable shape.

As shown in FIG. 4, the light module 34 may include a light source 66 for selectively emitting the light L via a light pipe 46 extending longitudinally between a first end 48 and a second end 50, with the first end 48 of the light pipe 46 facing the light source 66 and the second end 50 of the light pipe 46 facing the screen 36 for transmitting the light L from the light source 66 to the screen 36. The light module 34 may have a retainer 52 surrounding the light source 66, with the first end 48 of the light pipe 46 extending into the retainer 52 and facing the light source 66.

Figure 5:
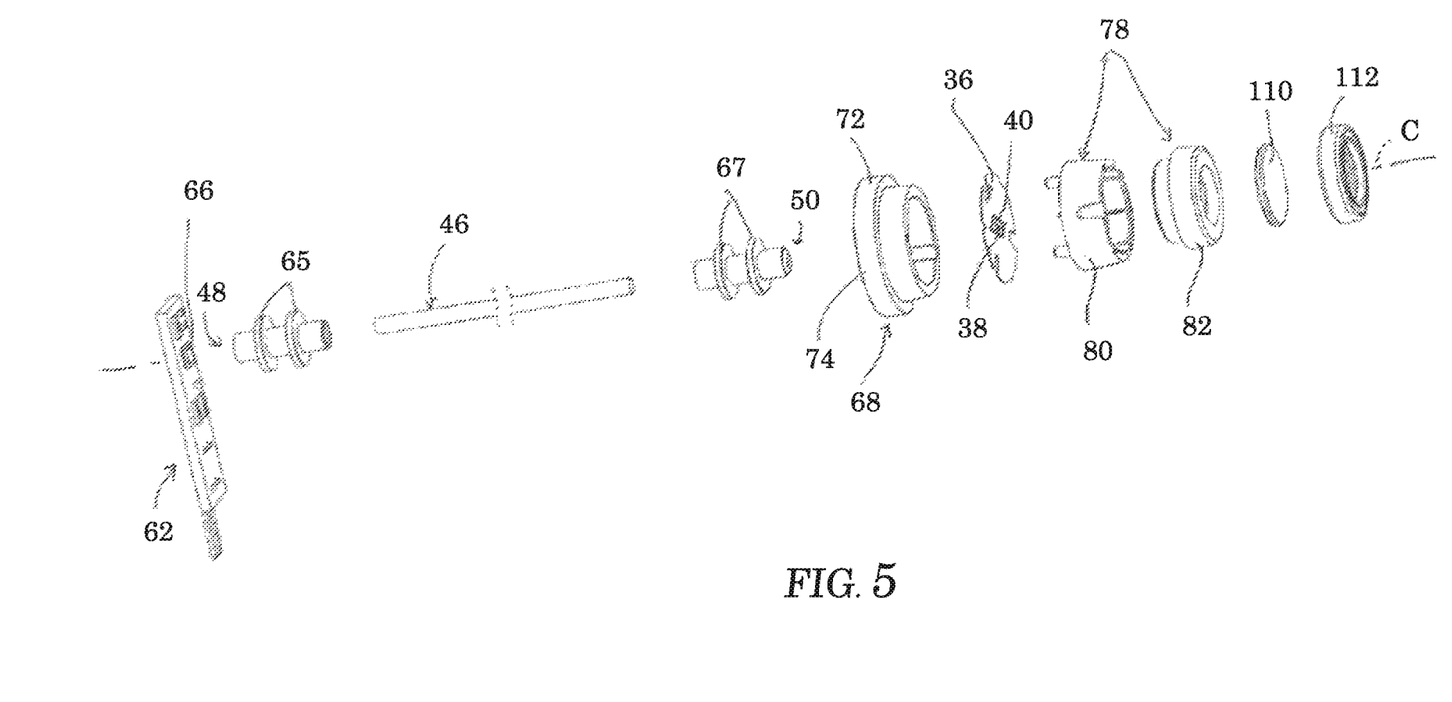
FIG. 5 is an exploded perspective view of the light pipe, the condensing lens, the screen, and the objective lens arrangement.

As shown in FIG. 4, the retainer 52 may have a substantially cuboidal configuration. It is to be appreciated that the retainer 52 may have any suitable shape. The retainer 52 may have a first opening with the light source 66 facing the first opening 56 for emitting the light L therethrough to outside of the retainer 52. The light pipe 46 may extend into the retainer 52 through the first opening 56 and face the light source 66. In an embodiment, the retainer 52 may have a second opening spaced from the first opening 56 for permitting electrical coupling with the light module 34. The second opening may accept an electrical connector (which is not shown but is generally understood in the art). The electrical connector couples with the light module 34 to provide electricity to the light module 34. As shown in FIGS. 4 and 5, the light module 34 may also include a printed circuit board 62 supporting the light source 66. In an embodiment, the printed circuit board 62 is coupled to the retainer 52.

The printed circuit board 62 may be disposed within the retainer 52, as shown in FIG. 4. The printed circuit board 62 may selectively provide electricity to the light source 66 for selectively emitting the light L therefrom. Furthermore, the amount of current provided by the printed circuit board 62 may vary depending on the application. In an embodiment, the printed circuit board 62 may provide any current value according to the needs of the light source.

In an embodiment, the light source 66 described above may be a semi-conductor light source, which may be supported by and electrically coupled to the printed circuit board 62. The light source 66 may be further defined as a light emitting diode (LED). Alternatively, the light source 66 may be further defined as a laser light source. In an embodiment, the light module 34 may include a plurality of light sources 66. It is to be appreciated that the light source 66 may be located anywhere in the retainer 52. In an embodiment, the light source 66 may be aligned with at least the first end 48 of the light pipe 46. In an embodiment, the light source 66 may be attached to the first end 48 of the light pipe 46.

In an embodiment, the light source 66 may be capable of emitting visible light across the color spectrum. In another embodiment, the light source 66 may also be capable of emitting non-visible light such as ultraviolet light which may illuminate a fluorescent material on the surface 22 for example.

It is to be appreciated that the light source 66 may be a single-color light source capable of emitting what is typically referred to as visible white light. It is also to be appreciated that the light source 66 may be a multi-color light source capable of emitting specific colors of the visible spectrum of the light L. For example, the light source 66 may be a red-green-blue (RGB) LED capable of individually emitting visible red, green, and blue light, or in combination emitting colored light formed by the combination of at least two of the visible red, green, and blue light.

In some embodiments, the light source 66 may be capable of emitting the light L in any direction. For example, the light source 66 may be a 60 degree semi-light source emitting the light L in a conical shape having an angle of 60 degrees between the outer most light L as measured along a plane extending through a center of the light L. It is to be appreciated that the light source 66 may be a 120 degree light source. It is also to be appreciated that the light source 66 may emit the light L at any suitable angle.

In any embodiment, the light source 66 is capable of emitting the light L at any intensity. It will be appreciated that the light source 66 could be of any suitable type or configuration and could include any suitable number of light sources without departing from the scope of the present teachings.

The first end 48 of the light pipe 46 may extend into the retainer 52 and face the light source 66. In one embodiment, the light pipe 46 extends through the first opening 56 into the retainer 52 such that the first end 48 is disposed within the retainer 52. The light module 34 may include a first collar 65 extending radially from the light pipe 46 at the first end 48 to engage the retainer 52. Said differently, the first collar 65 may extend radially to engage a portion of the retainer 52 surrounding the first opening 56. As shown in the FIG. 4 the first collar 65 may be further defined as a pair of first collars 65 spaced from one another along longitudinally along the light pipe 46. It is to be appreciated that the first collar 65 may be any number of first collars 65. The engagement of the first collar 65 with the retainer 52 couples the light pipe 46 with the retainer 52 and positions the first end 48 of the light pipe 46 relative to the light source 66 to facilitate transmission of the light L into the light pipe 46.

The second end 50 of the light pipe 46 may extend into the housing 28 and face the screen 36. In one embodiment, the light pipe 46 extends through the entrance opening 54 into the housing 28 such that the second end 50 is disposed within the housing 28. The light module 34 may include a second collar 67 extending radially from the light pipe 46 at the second end 50 to engage the housing 28. Said differently, the second collar 67 may extend radially to engage a portion of the housing 28 surrounding the entrance opening 54. As shown in the FIG. 8, the second collar 67 may be further defined as a pair of second collars 67 spaced from one another along longitudinally along the light pipe 46. It is to be appreciated that the second collar 67 may be any number of second collars 67. The engagement of the second collar 67 with the housing 28 couples the light pipe 46 with the housing 28 and positions the second end 50 of the light pipe 46 relative to the screen 36 to facilitate transmission of the light L from the light pipe 46 toward the screen 36.

The light pipe 46 may be at least partially transparent between the first end 48 and second end 50 for transmitting the light therethrough. In an embodiment, the light pipe 46 may be fully transparent between the first end 48 and second end 50. It is to be appreciated that the light pipe 46 may be of any desired transparency. Moreover, it is to be appreciated that the light L may transmit through the light pipe 46 in any suitable manner.

Figure 8:
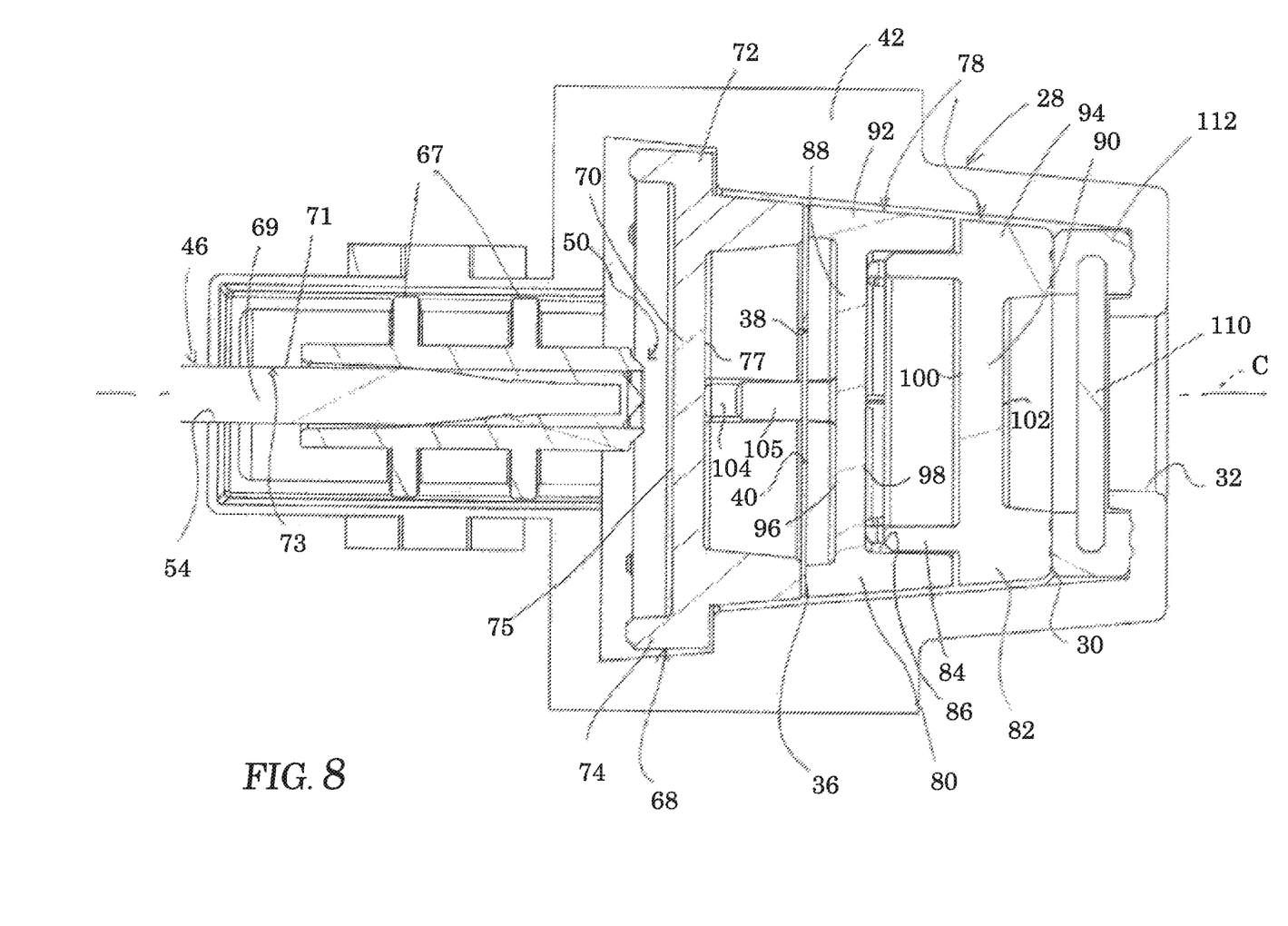
FIG. 8 is a cross-sectional view of a portion of the light pipe, the condensing lens, the screen, and the objective lens arrangement.

In a non-limiting embodiment, as shown in FIG. 8, the light pipe 46 may be comprised of an interior surface 69 and a sheath 71 surrounding the interior surface 69. The sheath 71 may at least partially envelope and abut the interior surface 69, with the abutment of the interior surface 69 and the sheath 71 defining a boundary region 73 for permitting total internal reflection of the light L through the internal surface 69 between the first end 48 and second end 50 of the light pipe 46. It is to be appreciated that the internal surface 69 and the sheath 71 may be formed of any suitable material allowing for light to be transmitted between the first end 48 and the second end 50 of the light pipe 46.

In another non-limiting embodiment, the light pipe 46 may be formed from a single layer. The light pipe 46 may be fully transparent or at least partially transparent. In this non-limiting embodiment, the light pipe may be formed from a plastic. The plastic forming the light pipe may completely transparent, or the light pipe 46 may be transparent in some parts and comprise areas that are not transparent in other parts. In a non-limiting embodiment, the non-transparent portions may formed by molding, painting, etching, spraying, graining, or other on the transparent portions so form the non-transparent portions. The amount of non-transparent portions and how they are formed may. Each of these methods to form the non-transparent portions can be done to achieve optimal light transmission performance through the light pipe 46 as needed.

Figure 9:
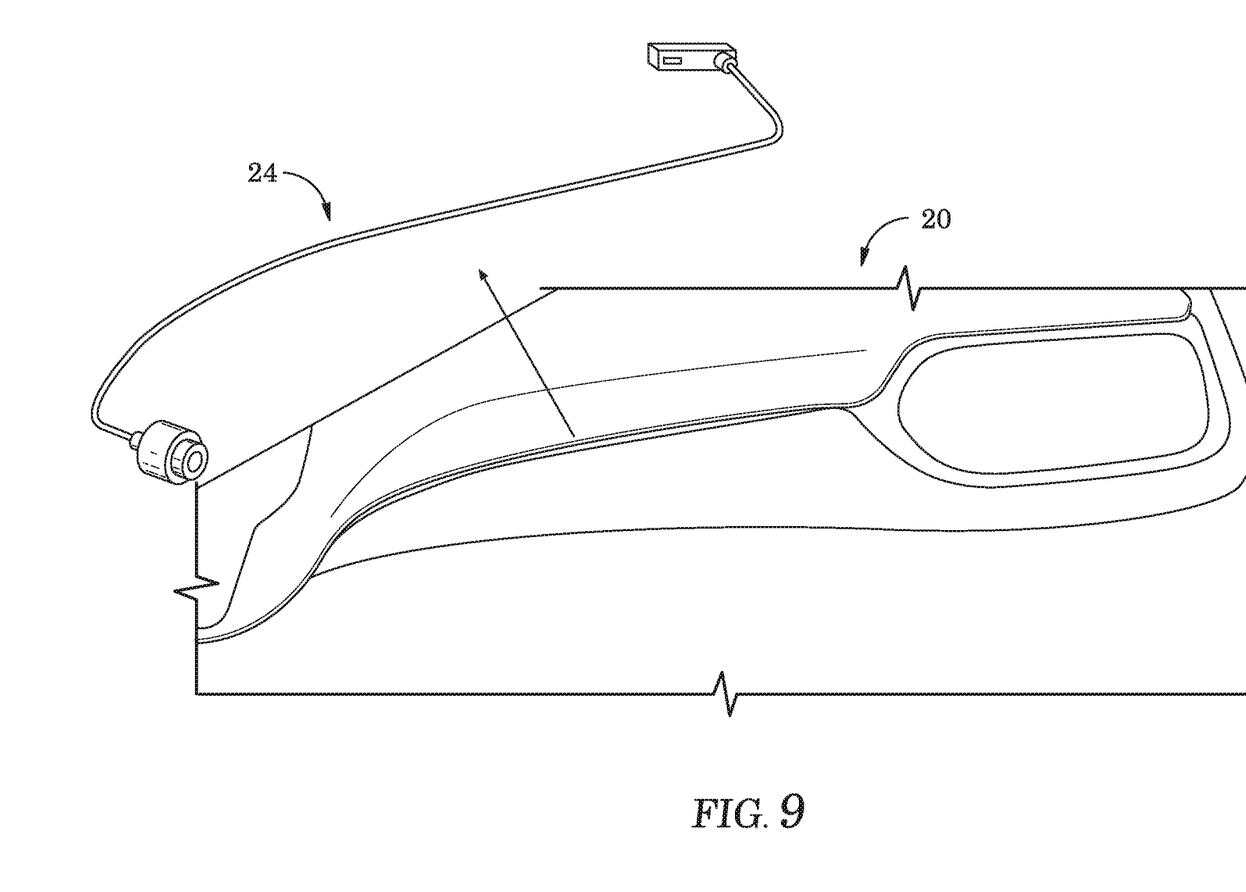
FIG. 9 is a perspective view of another embodiment of an illumination system including an illumination device.

The light pipe 46 may be capable of deflecting between the first and second ends 48, 50 to position the aperture 32 of the housing 28 independently of the light source 66. Said differently, the light pipe 46 may be manipulated by bending to position the first and second ends 48, 50 of the light pipe 46 in various positions, as shown in FIG. 9. In doing so, the light source 66 may deliver the light L to the surface 22 without directly facing the surface 22. Such a condition may be desirable when packaging requirements do not permit the light source 66 to directly face the surface 22 (i.e., the light source 66 will not fit in the location directly facing the surface 22.) Such a condition may also be desirable when the surface to be illuminated is on an exterior of a vehicle and the light source 66 is on the inside of a vehicle. Other examples of when the light source 66 and the surface 22 do not directly face one another are possible. Moreover, the light pipe 46 may be any suitable length for positioning the aperture 32 of the housing 28 independently of the light source 66 in any desirable position.

As shown in FIGS. 4-8, the illumination device 24 may further include a condensing lens 68 disposed between the light module 34 and the screen 36 for collimating the light L emitted from the light module 34 toward the screen 36. In a non-limiting embodiment, as shown in FIGS. 6-8, the condensing lens 68 may have a central portion 70 having a circular configuration and a mounting body 72 disposed about a periphery of the central portion 70.

In an embodiment, the condensing lens 68 may be fixed to the housing 28 and positioned between the screen 36 and the second end 50 of the light pipe 46, with the second end 50 facing the condensing lens 68 for transmitting the light L from the light pipe 46 through the second end 50 into the condensing lens 68 for collimating the light L toward the screen 36.

In a non-limiting embodiment, as shown in FIGS. 6-8, the mounting body 72 is disposed about the second end 50 of the light pipe 46. More specifically, the mounting body 72 has a wall 74 disposed radially about the central portion 70 and extending toward the entrance opening 54. The second end 50 of the light pipe 46 is disposed within the wall 74 below the central portion 70. As such, the light L emitted from the second end 50 of the light pipe 46 is retained within the wall 74, the central portion 70, and the housing 28 about the entrance opening 54. In one embodiment, at least the central portion 70 may be transparent such that the light L may pass through the central portion 70. As shown in FIG. 8, both the central portion 70 and the mounting body 72 may be transparent. In another embodiment, the mounting body 72 may be opaque such that the light L may not pass through the mounting body 72.

The mounting body 72 and the housing 28 may redirect the light L emitted from the light source 66 toward the central portion 70 where the light L can pass therethrough. It is to be appreciated that the central portion 70 and the mounting body 72 may have any suitable amount of transparency. Conversely, the central portion 70 and the mounting body 72 may have any suitable amount of opaqueness. In one embodiment, the central portion 70 is in axial alignment with the second end 50 of the light pipe 46 and the aperture 32. It is to be appreciated that the central portion 70 may be misaligned from the second end 50 of the light pipe 46 and the aperture 32.

In an embodiment, as shown in FIG. 8, the central portion 70 may have a substantially planar configuration. More specifically, the central portion 70 may have an entrance surface 75 and an exit surface 77 each having a substantially parallel and planar configuration.

In an embodiment, the central portion 70 may have a convex configuration. More specifically, the entrance surface 75 and the exit surface 77 may each have an arcuate configuration with the entrance surface 75 bowing outwardly toward the light source 66 and the exit surface 77 bowing outwardly toward the aperture 32. It is to be appreciated that the entrance and exit surfaces may each have a radius and may be configured in any suitable relationship for collimating the light L. The entrance and exit surfaces 75, 77 are configured to cooperatively interact to collimate the light L. The convex configuration collimates the light L such that the light L emitted from the second end 50 of the light pipe 46 in random, transverse directions may be gathered in the central portion 70 of the condensing lens 68 and redirected into substantially parallel light L directed toward the aperture 32. It is to be appreciated that the condensing lens 68 may be any suitable configuration (such as a concave configuration), may have any suitable radii, and may be any suitable distance from the second end 50 of the light pipe 46 for collimating the light L.

In an embodiment, as shown in FIGS. 4-8, the illumination device 24 may further include an objective lens arrangement 78 disposed between the screen 36 and the aperture 32 for transforming the light L from the base pattern configuration 40 into the predetermined illumination pattern 26. The objective lens arrangement 78 may perform any one of or any combination of the functions of repairing chromatic aberrations in the light L, inverting the light L from the base pattern configuration 40 to the predetermined illumination pattern 26, and focusing the base pattern configuration 40 into the predetermined illumination pattern 26 on the surface 22 having a specific size (i.e., the focal length). It is to be appreciated that the objective lens arrangement 78 may perform further functions not specifically described herein.

In an embodiment, as shown in FIGS. 6-8, the objective lens arrangement 78 may include a first lens 80 and a second lens 82 with the first lens 80 disposed between the light module 34 and the second lens 82. As such, the second lens 82 is disposed between the first lens 80 and the aperture 32. It is to be appreciated that the objective lens arrangement 78 may be comprised of any number of lenses.

In one embodiment, the second end 50 of the light pipe 46, the condensing lens 68, the screen 36, the first lens 80, the second lens 82, and the aperture 32 are generally linearly aligned. The general linear alignment increases the efficiency of the illumination device 24 by facilitating a direct path for the light L from the emission of the light L at the second end 50 of the light pipe 46 to the passage of the light L out of the cavity 30 of the housing 28 through the aperture 32. It is to be appreciated that these components may be misaligned.

In an embodiment, as shown in FIGS. 6-8, the second lens 82 may have a lens wall 84 and the first lens 80 may have a recess 86 with the lens wall 84 disposed in the recess 86 to index the first and second lenses 80, 82 relative to one another. More specifically, each of the first and second lenses 80, 82 may have a central body 88, 90 and a mounting frame 92, 94 radially disposed about the central body 88, 90. The mounting frame 94 of the second lens 82 extends toward the first lens 80 with the mounting frame 94 defined as the lens wall 84. The mounting frame 92 of the first lens 80 extends toward the second lens 82 with the mounting frame 92 and the central body 90 defining the recess 86. Each of the mounting frames 92, 94 of the first and second lenses 80, 82 may have a diameter with the diameter of the mounting frame 94 of the second lens 82 less than the diameter of the mounting frame 92 of the first lens 80 such that the lens wall 84 is disposed within the recess 86. As described above, the first and second lenses 80, 82 may be aligned with second end 50 of the light pipe 46, the condensing lens 68, the screen 36, and the aperture 32. More specifically, the central body 88, 90 of each of the first and second lenses 80, 82 may be aligned with the second end 50 of the light pipe 46, the central portion 70 of the condensing lens 68, the screen 36, and the aperture 32. The lens wall 84 and the recess 86 may be configured such that the mounting frames 92, 94 engage each other and maintain the alignment of the first and second lenses 80, 82 with the second end 50 of the light pipe 46, the central portion 70 of the condensing lens 68, the screen 36, and the aperture 32.

Those having ordinary skill in the art will also appreciate that the opposite may be true, i.e., the first lens 80 may have the lens wall 84 and the second lens 82 may have the recess 86. Similarly, the first and second lenses 80, 82 may also be indexed relative to one another in any suitable manner.

An example of the objective lens arrangement 78, which includes some of the features that may be incorporated into the device described herein is described in U.S. patent application Ser. No. 15/170,268, which is herein incorporated by reference. However, it should be understood that the device described herein is not limited to the illumination device described therein or the exemplary embodiments described herein.

In one embodiment, at least the central body 88, 90 of each of the first and second lenses 80, 82 is transparent such that the light L may pass through the central body 88, 90. As shown in FIG. 8, both the central body 88, 90 and the mounting frame 92, 94 of each of the first and second lenses

80, 82 may be transparent. The mounting frame 92, 94 of each of the first and second lenses 80, 82 may be opaque such that the light L may not pass through the mounting frame 92, 94. As such, the mounting frame 92, 94 of each of the first and second lenses 80, 82 redirects the light L emitted from the light source 66 toward the central body 88, 90 of each of the first and second lenses 80, 82 where the light L can pass therethrough. Those having ordinary skill in the art will appreciate that the central body 88, 90 and the mounting frame 92, 94 of each of the first and second lenses 80, 82 may have any suitable amount of transparency. Conversely, the central body 88, 90 and the mounting frame 92, 94 of each of the first and second lenses 80, 82 may have any suitable amount of opaqueness.

In an embodiment, as shown in FIG. 8, the first lens 80 may have first and second surfaces 96, 98 spaced from one another and the second lens 82 may have first and second surfaces 100, 102 spaced from one another with the first surface 96 of the first lens 80 facing the light module 34, the second surface 102 of the second lens 82 facing the aperture 32, and with the second surface 98 of the first lens 80 and the first surface 100 of the second lens 82 facing one another. In one embodiment, the second surface 98 of the first lens 80 and the first surface 100 of the second lens 82 are spaced from each other as shown in FIG. 8. It is to be appreciated that the second surface 98 of the first lens 80 may abut the first surface 100 of the second lens 82.

In an embodiment, as shown in FIG. 8, the central portion 70 may have a substantially planar configuration. More specifically, the central portion 70 the first and second surfaces 96, 98, 100, 102 may each have substantially parallel and planar configurations. Alternatively, each of the first and second surfaces 96, 98, 100, 102 of the first and second lenses 80, 82 may be curved with each surface 96, 98, 100, 102 having a radius. It is also to be appreciated that the first and second lenses 80, 82 may be configured in any way suitable for performing desired functions including, but not limited to, repairing chromatic aberrations in the light L, inverting the light L from the base pattern configuration 40 to the predetermined illumination pattern 26, and focusing the base pattern configuration 40 into the predetermined illumination pattern 26 on the surface 22 having a specific size. It is to be appreciated that the first and second surfaces 96, 98, 100, 102 of the first and second lenses 80, 82 may have any suitable size, shape, and configuration without escaping the scope of the teachings disclosed herein.

In an embodiment, the condensing lens 68 and the first and second lenses 80, 82 may be comprised of polycarbonate. It is to be appreciated that the condensing lens 68 and the first and second lenses 80, 82 may be comprised of poly(methyl methacrylate) ("PMMA"), glass, silicone, or any other suitable material for allowing transmission of the light L therethrough. It is also to be appreciated that the condensing lens 68 and the first and second lenses 80, 82 may be individually comprised of varying material. In one embodiment, the condensing lens 68 and the first lens 80 comprise the same material. It is to be appreciated that certain materials, such as silicone, have properties conducive to light having an increased intensity, such as the light L emitted when used with the exterior of the vehicle.

In an embodiment, the first lens 80 may have a plurality of studs 105. The condensing lens 68 may be fixed to the housing 28 and may define a plurality of pockets 104. In one embodiment, the mounting body 72 of the condensing lens 68 comprises the pockets 104 with the pockets 104 radially disposed about the central portion 70. The studs 105 and the pockets 104 are aligned such that each of the studs 105 is independently disposed in each of the pockets 104.

In an embodiment, as shown in FIG. 6, the illumination device may further include an indexing interface 106 that aligns the screen 36 relative to the housing 28 for positioning the predetermined illumination pattern 26 on the surface 22. The indexing interface 106 may include a plurality of radially-spaced voids 108. The screen 36 may also comprise the voids 108. The screen 36 may be disposed between the objective lens arrangement 78 and the condensing lens 68, with each of the plurality of studs 105 individually disposed within the plurality of voids 108 and the plurality of pockets 104 to align and fix the screen 36 relative to the housing 28.

The alignment of the screen 36 refers to the positioning of the base pattern configuration 40 relative to the housing 28 such that the light L that exits the screen 36 in the base pattern configuration 40, passes through the aperture 32, and is projected onto the surface 22 in the predetermined illumination pattern 26 with the predetermined illumination pattern 26 rotationally aligned on the surface 22 in a desired orientation. In one embodiment, the housing 28 is fixed relative to the surface 22. As such, the rotational alignment of the predetermined illumination pattern 26 in the desired orientation is dictated by the alignment of the screen 36 relative to the housing 28.

In an embodiment, the screen 36 may have a substantially thin and flat configuration parallel to the aperture 32 with the screen 36 sandwiched between the condensing lens 68 and the first lens 80. The screen 36 may have an axial center C. In an embodiment, the screen 36 extends radially from the axial center C such that the screen 36 is disposed between the mounting body 72 of the condensing lens 68 and the mounting frame 92 of the first lens 80. In an embodiment, the axial center C may be aligned with the aperture 32. In an embodiment, the axial center C may be aligned with the light source 66 and the aperture 32.

The plurality of voids 108 are disposed about and spaced from the axial center C. As described above, the plurality of voids 108 are configured to have the studs 105 disposed therein. Because the screen is mounted to the condensing lens 68, which in-turn is mounted to the housing 28, the coupling of the screen 36 to the condensing lens 68 mounts the screen 36 relative to the housing 28. As such, the orientation of the voids 108 about the central axis dictates the orientation of the screen 36 relative to the housing 28.

Therefore, the desired orientation of the base pattern configuration 40 relative to the housing 28 is considered when the voids 108 are positioned about the central axis. It is to be appreciated that the voids 108 may be disposed on other components, such as the first lens 80 or the condensing lens 68, with the screen 36 having studs 105 to engage the voids 108. Likewise, the indexing interface 106 may be any suitable configuration to align and fix the screen 36 relative to the housing 28.

The at least one opening 38 of the screen 36 having the base pattern configuration 40 may be positioned at or about the axial center C. It is to be appreciated that the at least one opening 38 may be positioned anywhere on the screen 36. The at least one opening 38 of the screen 36 having the base pattern configuration 40 permits the transmission of the light L therethrough. As such the at least one opening 38 is shaped such that the light L transmitted therethrough is similar to the predetermined illumination pattern 26 on the surface 22. It is to be appreciated that the screen 36 may have a transparent or semi-transparent panel disposed within the at least one opening 38. For example, the panel may be colored such that the light L transmitted through the panel takes on the colored properties of the panel which is then projected on the surface 22. It is to be appreciated that the at least one opening 38 of the screen 36 may be any suitable configuration for permitting the transmission of the light L therethrough in the base pattern configuration 40.

Because the opening 38 of the screen 36 having the base pattern configuration 40 dictates the predetermined illumination pattern 26 on the surface 22, significant consideration is given to the shape, configuration, and orientation of the opening 38 relative to the housing 28 during the design of the illumination device 24. Likewise, the orientation of the housing 28 relative to surface 22 (such as the rotational position of the housing 28 and the angle at which the light L is projected from the housing 28 onto the surface 22) is given consideration when designing the illumination system 20 to yield the desired predetermined illumination pattern 26. Furthermore, the effect that each of the condensing lens 68 and the objective lens arrangement 78 have on the light L as the light L projects from the light module 34 through the aperture 32 is also given consideration when determining the size, shape, configuration, and material of the condensing lens 68 and the objective lens arrangement 78.

In one embodiment, the illumination device 24 may further include a disk 110 disposed between the aperture 32 and the objective lens arrangement 78, as shown in FIGS. 4-8. The illumination device 24 may further include a seal 112 engaging each of the disk 110 and the housing 28 about the aperture 32. The disk 110 and the seal 112 close the aperture 32 and seal the housing 28 at the aperture 32 to prevent a fluid from permeating into the cavity 30 of the housing 28. Such a configuration may be advantageous when used in the exterior of the vehicle. However, it is to be appreciated that the disk 110 and the seal 112 may be used in the interior of the vehicle.

Referring generally to the configuration shown in FIGS. 3 and 4, to project the light L on the surface 22 in the predetermined illumination pattern 26, the light source 66 of the light module 34 emits the light L in a plurality of directions. The light L transmits into the light pipe 46 at the first end 48 and transmits through the light pipe 46 to the second end 50. The light emits from the light pipe 46 at the second end 50, as generally shown in FIG. 8. The light L may be transmitted through the condensing lens 68 and collimated such that the light L is substantially parallel. The light L transmits through the at least one opening 38 of the screen 36 and is configured into the base pattern configuration 40. The light L may then transmit through the objective lens arrangement 78 where the light L may be configured from the base pattern configuration 40 into the orientation that will be the predetermined illumination pattern 26. The light L transmits through the disk 110. The light L then passes through the aperture 32 and is projected onto the surface 22 in the predetermined illumination pattern 26, as shown in FIG. 2.

In this way, the present invention reduces the cost of manufacturing the illumination systems of a vehicle. Specifically, the light may be projected onto any surface. As such, the surface is not required to be a particular material having specific transparency properties to allow for light to be projected therethrough from behind the surface. Furthermore, the teachings disclosed herein allow for the aftermarket application of the illumination device in that the illumination may be mounted to project the light onto the surface. It will be appreciated that the present invention is compatible with and can be incorporated modularly into a number of different types of applications within vehicles without necessitating significant changes to existing manufacturing equipment and/or tooling.

The teachings disclosed herein have been described in an illustrative manner. It is to be understood that the terminology which has been used is intended to be in the nature of words of description rather than of limitation. Although the features described above are in particular combination, one of ordinary skill in the art will appreciate that each feature may be re-arranged or omitted. Many modifications and variations of the present invention are possible in light of the above teachings.

What is claimed is:

1. An illumination device for projecting light in a predetermined illumination pattern on a surface, the illumination device comprising:
   a light module including a light source and a light pipe, wherein the light pipe extends longitudinally between a first end and a second end and is configured to transmit light in any suitable manner between the first end and the second end;
   a retainer housing the light source, the retainer comprising a first opening;
   a housing having a cavity, an entrance opening at a first housing end for receiving the light emitted from the light source, an aperture at a second housing end, and a central axis extending from a first end having the entrance opening to a second end having the aperture; and
   a screen at least partially disposed in the cavity between the entrance opening and the aperture of the housing, wherein the screen includes at least one opening defining a base pattern configuration corresponding to the predetermined illumination pattern; and
   an indexing interface configured to rotationally align the screen having the opening defining the base pattern configuration relative to the housing about the central axis, wherein
   at least one of the indexing interface and the screen comprise a plurality of radially-spaced voids,
   the first end of the light pipe faces the light source and the second end of the light pipe faces the screen,
   the light pipe selectively transmits light from the light source to the cavity, and
   the radially-spaced voids rotationally align the screen having the opening defining the base pattern configuration and the corresponding predetermined illumination pattern on the surface, relative to the central axis of the housing.

2. The illumination device of claim 1, wherein the light transmitted from the light source to the cavity passes through the at least one opening defining the base pattern configuration and projects through the aperture of the housing onto the surface in the predetermined illumination pattern.

3. The illumination device of claim 2, wherein the light pipe is at least partially transparent for transmitting the light from the first end to the second end.

4. The illumination device of claim 3, wherein the light pipe is flexible and configured to deflect between the first end and the second end such that the light source does not have to be directly aligned with the surface.

5. The illumination device of claim 3, wherein the light pipe comprises:

at least a first collar extending radially from the light pipe proximal to the first end of the light pipe, the first collar configured to engage a portion of the retainer surrounding the first opening, and at least a second collar element extending radially from the light pipe proximal to the second end of the light pipe, the second collar configured to engage a portion of the housing surrounding the entrance opening.

6. The illumination device of claim 3, wherein the light source is at least one of a semi-conductor light source, a light-emitting diode (LED), a laser light source, or an ultraviolet light source.

7. The illumination device of claim 3 further comprises a disk configured to transmit light and a seal engaging the disk and the housing, wherein the disk and the seal combined are configured to seal the housing at the aperture.

8. The illumination device of claim 3, wherein the housing further comprises a condensing lens fixed to the housing and positioned between the second end of the light pipe and the screen such that the light that enters the housing and passes through the condensing lens is collimated toward the screen.

9. The illumination device of claim 8, wherein the housing further comprises an objective lens arrangement including a first lens and a second lens, the objective lens arrangement positioned between the screen and the aperture of the housing such that the light that passes through the base pattern configuration is configured into a correct orientation of the predetermined illumination pattern by the objective lens.

10. The illumination device of claim 9, wherein
the first lens comprises a first mounting frame radially disposed around a first central body which is at least partially transparent,
the second lens comprises a second mounting frame radially disposed around a second central body which is at least partially transparent,
the second mounting frame extends towards the first lens, the second mounting frame defining a second lens wall,
the first mounting frame extending towards the second lens with the first mounting frame and second central body defining a first lens recess, and
the first lens recess is configured to accept the second lens wall to index the first lens and the second lens relative to one another.

11. The illumination device of claim 10, wherein:
the condensing lens comprises a mounting body, including a wall disposed radially about a central portion of the condensing lens, and a plurality of pockets radially disposed about the central portion, wherein at least the central portion of the condensing lens is at least partially transparent, and
the first lens comprises a plurality of studs and is disposed between the light module and the second lens, and
each of the plurality of studs is individually disposed within the plurality of pockets of the condensing lens, the plurality of radially spaced voids of the indexing interface, and the plurality of radially spaced voids of the screen, to align and fix the screen relative to the housing.

12. The illumination device of claim 3, wherein the light module further comprises a printed circuit board supporting the light source.

13. The illumination device of claim 1, wherein at least one opening of the screen has a transparent or semi-transparent panel disposed within the at least one opening.

14. An illumination system comprising:
one or more of a surface; and
one or more of an illumination device comprising:
a light module including a light source and a light pipe, wherein the light pipe extends longitudinally between a first end and a second end and is configured to transmit light in any suitable manner between the first end and the second end;
a retainer housing the light source, the retainer comprising a first opening;
a housing having a cavity, an entrance opening at a first housing end for receiving the light emitted from the light source, an aperture at a second housing end, and a central axis extending from a first end having the entrance opening to a second end having the aperture; and
a screen at least partially disposed in the cavity between the entrance opening and the aperture of the housing, wherein the screen includes at least one opening defining a base pattern configuration corresponding to a predetermined illumination pattern; and
an indexing interface configured to rotationally align the screen having the opening defining the base pattern configuration relative to the housing about the central axis, wherein
at least one of the indexing interface and the screen comprise a plurality of radially-spaced voids,
the first end of the light pipe faces the light source and the second end of the light pipe faces the screen,
the light pipe selectively transmits light from the light source to the cavity,
the radially-spaced voids rotationally align the screen having the opening defining the base pattern configuration and the corresponding predetermined illumination pattern on the surface., relative to the central axis of the housing, and
the light transmitted from the light source to the cavity passes through the at least one opening of the base pattern configuration and projects through the aperture of the housing onto the surface in the predetermined illumination pattern.

15. The illumination system of claim 14, wherein the light pipe is flexible and configured to deflect between the first end and the second end such that the light source does not have to directly face the surface.

16. The illumination system of claim 14, wherein the housing further comprises:
a condensing lens fixed to the housing and positioned between the second end of the light pipe and the screen such that the light that enters the housing and passes through the condensing lens is collimated toward the screen, and
an objective lens arrangement including a first lens and a second lens, the objective lens arrangement positioned between the screen and the aperture of the housing such that the light that passes through the base pattern configuration is configured into a correct orientation of the predetermined illumination pattern by the objective lens.

17. The illumination system of claim 14, wherein the housing further comprises a disk configured to transmit light and a seal engaging the disk and the housing, wherein the disk and the sealed combined are configured to seal the housing at the aperture.

18. The illumination system of claim 14, wherein the surface is located on at least one of an exterior of a vehicle or an interior of the vehicle.

19. The illumination system of claim 14, wherein the illumination system comprises a plurality of surfaces.

* * * * *